United States Patent Office 3,137,810
Patented June 16, 1964

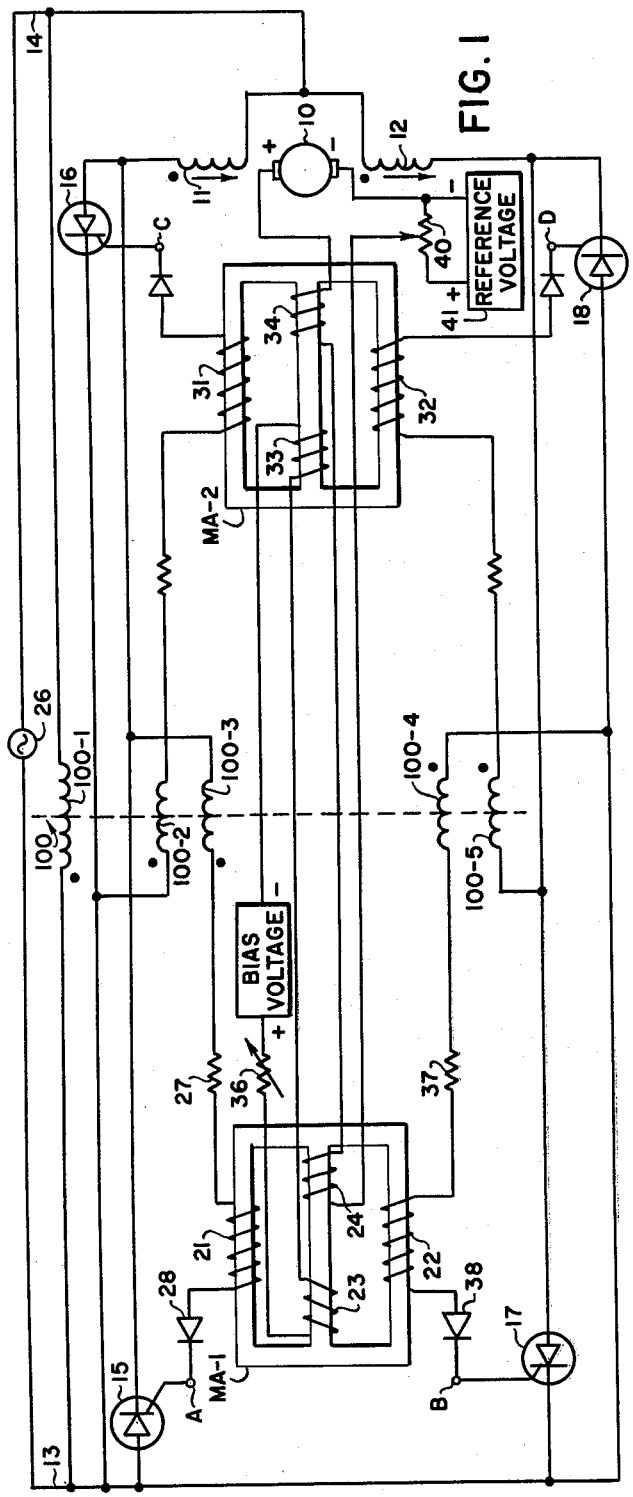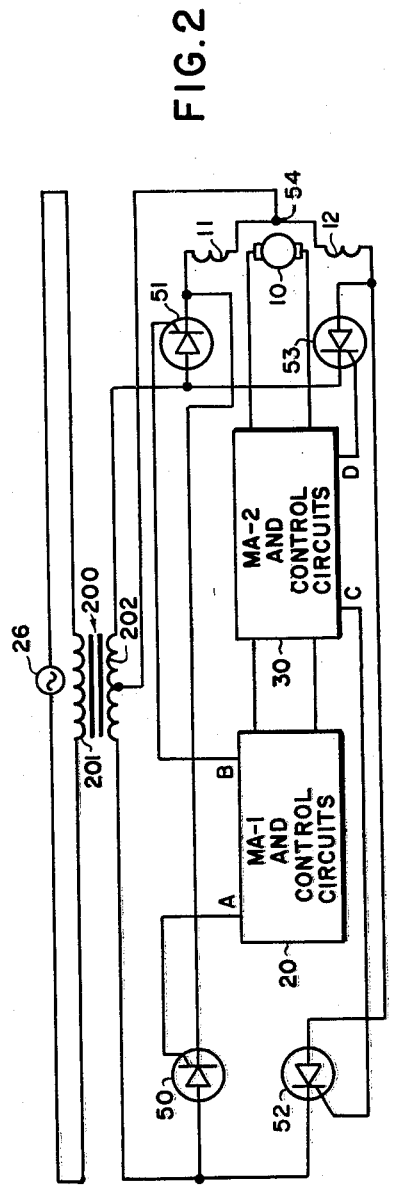

3,137,810
CONTROLLED RECTIFIER CIRCUITS
Lawrence R. Foote, Roanoke, Va., assignor to General
Electric Company, a corporation of New York
Filed Dec. 19, 1961, Ser. No. 160,608
4 Claims. (Cl. 322—73)

This invention relates to controlled rectifier circuits and particularly, to controlled rectifier circuits for selectively supplying power to a load in accordance with particular characteristics of the load.

The type of load contemplated by the invention may take the form of field windings on either a motor or generator. In the specific type of circuits being considered, for example, controlled rectifiers are connected in series with the field windings across an alternating current power supply and may be selectively rendered conductive for periods of time determined by either the speed of the motor or the terminal voltage of the generator. Because of the inductance of the field windings, the current flow therethrough is substantially continuous even when the voltage is applied in this pulse width modulated form. As a consequence, the amount of power delivered to the windings is determined by the magnitude of the applied voltage and the duration of its application.

From another aspect, the invention is directed to the utilization of controlled rectifiers as switching means for selectively applying power to a load for periods of time determined by an independent control means. In this case, the load and control means may or may not be functionally related.

The controlled rectifiers utilized herein are of the silicon type. These rectifiers, as now well recognized, are PNPN devices having characteristics generally similar to gas thyratrons. They are particularly applicable in circuits such as here considered because of small size and weight, high speed of operation, and easily accommodated triggering requirements. Typically, a silicon controlled rectifier can be switched into a high conduction, or "on" mode, by a pulse of 1.5 volts and 30 milliamperes applied between its gate and cathode. Once conduction is started, it will continue indefinitely or until the anode current is diverted for approximately 20 microseconds. These electrical characteristics may vary from device to device, but are always considerably more favorable than those of the conventional gas thyratron.

An object of the invention is to provide improved silicon controlled rectifier circuits for controlling the power delivered to a load.

The generation and application of triggering pulses for turning a silicon controlled rectifier "on" and subsequently for turning it "off" by diverting the anode current must be designed to take maximum advantage of the electrical characteristics cited. Where such short turn-on and turn-off times are available, the control equipment must be of high sensitivity in order to avoid introducing extraneous variations in consecutive operations. One such control arrangement employs self-saturating magnetic amplifiers of the "amplistat" type. These magnetic amplifiers are controlled to "fire," or produce an output triggering pulse, in accordance with predetermined conditions or controls.

Another object of the invention is to provide magnetic amplifier means for controlling silicon controlled rectifiers to deliver power to a load in accordance with selected or determinable conditions.

Relative to the application of the invention to motor and generator field control, many applications of motors and generators require rapid reversal of the existing state of operation. Motors, for example, may be used for controlling heavy equipment in forward and reverse directions in accordance with the rotational directions of the motor. Such direction reversal is effected by plugging, i.e., reversing the voltage on, the field windings. Generators often supply preselected output voltages under the control of regulating circuits. Immediate response to, and compensation for, changes in the output voltage may also be accomplished by changing the current in the field windings. The present invention employs a split field winding arrangement and uses a pair of controlled rectifiers to supply rectified voltage to each portion of the winding. Two magnetic amplifiers are used to selectively produce triggering impulses to render the controlled rectifiers conductive during each half cycle for an appropriate period of time to initiate the desired operation.

Another object of the invention is to provide improved controlled rectifier circuits furnishing a reversing and plugging alternating current-to-direct current controller for motors or generators.

A feature of the invention relates to the provision of control circuits for motor or generator excitation wherein the field windings are divided in two and are supplied via controlled rectifiers for controlled periods of time on successive half cycles of an alternating current supply.

In the illustrative embodiments, circuits are described for providing generator excitation from an alternating current source; however, it is understood that the teachings of the invention are also applicable to motor control circuitry.

The circuits in the embodiment illustrate the supply of individual halves of a generator field winding on succeeding half cycles of an alternating current supply. In a first embodiment, each half winding is serially connected with a pair of oppositely oriented silicon controlled rectifiers across the alternating current source. The half windings are wound, or connected, to produce a unidirectional field when oppositely oriented controlled rectifiers in each pair are alternately enabled during successive half cycles of the alternating current supply. Thus, by selectively controlling the conduction period of the oppositely oriented controlled rectifiers in each pair, the amount and polarity of the power applied to establish a magnetic field is selectively controlled. Separate magnetic amplifiers are used to control the power applied to develop each polarization of magnetic field and the firing time of the magnetic amplifiers is determined by the difference between a reference voltage level and the generator output voltage.

In a second embodiment of the invention, each half of a split generator field winding is supplied on successive half cycles of alternating current via a pair of silicon controlled rectifiers connected to opposite terminals of a center-tapped alternating current source; the center-tap of the source being connected to a common junction between halves of the generator field winding. Here too, two magnetic amplifiers are used to selectively trigger the controlled rectifiers into conduction. In this embodiment, however, each magnetic amplifier controls the controlled rectifiers associated with one half of the field winding.

The above and other novel features of the invention are set forth with particularity in the appended claims. The invention itself, however, both as to its organization and method of operation, together with further objects and features thereof may best be understood by reference to the following description taken in conjunction with the accompanying drawings wherein:

FIG. 1 is a circuit schematic of a generator control circuit using magnetic amplifier controlled rectifiers to selectively supply power to separate halves of the field winding on successive half cycles of alternating current, in accordance with desired operation; and FIG. 2 is a circuit schematic of a generator control circuit using magnetic amplifier controlled rectifiers to selectively supply power to particular halves of the field winding on successive half cycles of alternating current in accordance with desired operation.

In the circuit schematic of FIG. 1 an alternating current source 26 supplies power over conductors 13 and 14 to the divided field windings 11 and 12 associated with the armature 10 of a generator. The field windings 11 and 12 have generally the same number of turns and are respectively wound as illustrated by the conventional "dot" notation. The power delivered to field winding portion 11 from alternating current source 26 is controlled by the conduction interval of controlled rectifiers 15 and 16 and the power delivered to field winding portion 12 is controlled by the conduction interval of controlled rectifiers 17 and 18. The pairs of rectifiers 15, 16 and 17, 18 are serially connected between source 26 and windings 11 and 12 respectively and are oriented to provide a full sinusoid of current to each field winding portion if both are turned on for a full conduction interval. However, as subsequently described, control circuitry in the form of magnetic amplifiers MA-1 and MA-2 permits conduction of only one rectifier in each pair during each half cycle in accordance with the operation desired. A magnetic flux of constant duration is therefore developed.

Magnetic amplifiers MA-1 and MA-2 are employed to selectively deliver triggering impulses to associated controlled rectifiers at appropriate times to yield the desired operating conditions of the generator. These magnetic amplifiers may take the form of the well known "amplistat" or self-saturating variety. Magnetic amplifier MA-1 comprises a pair of gate windings 21 and 22, and control windings 23 and 24. In accordance with conventional practice, biasing current in control winding 23 establishes a magnetic field in the core of magnetic amplifier MA-1 that is in opposition to that which will be established in the gate windings in response to energization. Control current in control winding 24 varies the firing time of the magnetic amplifier. When the current flow through gate windings 21 or 22 attains sufficient magnitude to saturate the core of magnetic amplifier MA-1, the impedance thereof becomes substantially less and a large current pulse is supplied therethrough that is used as a triggering signal for the controlled rectifiers. The interval of time required before saturation of the magnetic core is determined by the amount of current flow through control windings 23 and 24. Magnetic amplifier MA-2 has similar gate windings 31 and 32 and control windings 33 and 34.

Power is supplied to the gate windings 21, 22, 31, and 32 of the magnetic amplifiers by means of the secondary windings 100-3, 100-4, 100-2, and 100-5 respectively, of input transformer 100. Primary winding 100-1 of transformer 100 is connected directly across alternating current supply 26 and consequently, a sinusoidal voltage is induced in the aforecited secondary windings. Each secondary winding is serially connected between the gate and cathode electrodes of a controlled rectifier by a small impedance, a conventional rectifier, and a gate winding. For example, secondary winding 100-3 is in series circuit arrangement with a small impedance 27, gate winding 21, rectifier 28, and the gate to cathode path of controlled rectifier 15. A similar circuit exists containing each secondary winding and controlled rectifier.

In the described circuit of secondary winding 100-3 conventional rectifier 28 is oriented to permit current flow only in the direction of the gate electrode of controlled rectifier 15. This orientation provides means for applying a positive triggering pulse to the electrode of controlled rectifier 15 upon saturation of magnetic amplifier MA-1 during the appropriate half cycle of voltage from alternating current source 26. Each secondary circuit is similarly arranged.

Magnetic amplifier MA-1 and its counterpart, magnetic amplifier MA-2, are maintained in an "off" condition by the bias voltage source 35 which supplies a negative saturating current to the cores of both magnetic amplifiers.

The bias control circuit comprises the positive terminal of bias voltage supply 35, variable resistance 36, control winding 23, control winding 33, and the negative terminal of bias voltage source 35. The magnitude of the saturating current is controlled by changing the impedance of variable resistor 36.

The firing time of the magnetic amplifiers and hence, the amount of power supplied to field windings 11 and 12, is controlled by the current in control windings 24 and 34. These windings are serially connected with armature 10 and a reference potentiometer 40. Reference potentiometer 40 is supplied by a direct voltage reference source 41 which may take many forms and in fact may be associated with the terminal voltage of the generator via a voltage regulation circuit. The position of the slider of potentiometer 40 determines the amount of current flow in control windings 24 and 34 for any particular terminal voltage across armature 10. When the voltage across armature 10 and the voltage from potentiometer 40 are equal and opposite, no current flows in control windings 24 and 34 and the power applied to the windings 11 and 12 is entirely determined by the combined effect of the biasing current in control windings 23 and 33 and the energization of gate windings 21, 22, 31, and 32. When the voltage across armature 10 and the voltage from potentiometer 40 are not equal, current flows through control windings 24 and 34 and modifies the saturation level of the magnetic amplifier cores. It will be apparent that the magnitude and polarity of the described inequality determines which magnetic amplifier will fire earlier on succeeding half cycles from alternating current source 26.

A complete understanding of the operation of the instant circuit will follow from consideration of a typical cycle of operation. This consideration will be assisted by assuming that rotation of armature 10 will produce an output voltage of the polarity shown on the drawing when current from alternating current source 26 flows into the dotted end of either portion 11 or 12 of the field windings. Reversal of the current flow in windings 11 and 12 in accordance with this assumption will produce a voltage of opposite polarity at the armature terminals.

If the initial generator voltage is zero, reference voltage source 41 will produce a voltage across potentiometer 40 that causes current flow from the slider thereof through control windings 24 and 34 and armature 10 to the negative terminal of reference voltage source 41. Because control windings 24 and 34 are oppositely wound upon the cores of their respective magnetic amplifiers, this current flow tends to create a positive saturation in the core of magnetic amplifier MA-1 and a negative saturation in the core of magnetic amplifier MA-2. In other words, this current flow shortens the firing time of magnetic amplifier MA-1 and increases the firing time of magnetic amplifier MA-2. This condition encourages generator build-up in the manner now to be explained.

Assuming that the alternating current from source 26 is increasing in a positive direction on conductor 13, the voltage induced in the secondary windings of transformer 100 will be positive on the dotted ends thereof. This induces a current flow in secondary winding 100-3 associated with controlled rectifier 15 and in secondary winding 100-5 associated with controlled rectifier 18. Upon saturation of the magnetic cores of magnetic amplifiers MA-1 and MA-2, the gate windings 21 and 32 exhibit substantially less impedance than initially and a considerable current pulse is applied to the gate electrodes of controlled rectifiers 15 and 18. This renders the controlled rectifiers conductive and provides low impedance paths between conductors 13 and 14; the first path comprising rectifier 15 and winding 11 and the second path comprising rectifier 18 and winding 12. It should be noticed that whereas the current flow in winding 11 is into the dotted terminal and therefore causes generation of voltage with the polarity shown, the current flow in winding 12 is into the undotted terminal and therefore causes generation of voltage with a polarity opposite that shown. By recalling the initial saturation of magnetic amplifiers MA–1 and MA–2, it will be apparent that magnetic amplifier MA–1 fires earlier in the half cycle than magnetic amplifier MA–2 and therefore controlled rectifier 15 is triggered into conduction earlier than controlled rectifier 18. The cumulative effect is to cause the generator to produce a voltage of the polarity shown.

During the succeeding half cycle when the voltage on conductor 13 is increasing in a negative direction, the voltage induced in secondary windings 100–3 and 100–5 places a reverse bias between the respective anodes and cathodes of controlled rectifiers 15 and 18 rendering them nonconductive. Thus, controlled rectifiers 15 and 18 are conductive only during one half cycle and for periods of time determined by the firing times of magnetic amplifiers MA–1 and MA–2.

During the second half cycle when controlled rectifiers 15 and 18 are in a nonconducting state, controlled rectifiers 16 and 17 will be rendered conductive in accordance with the saturation of magnetic amplifiers MA–2 and MA–1, respectively. The circuit for enabling controlled rectifier 17 comprises secondary winding 100–4, resistor 37, gate winding 22, and conventional rectifier 38. A similar circuit including secondary winding 100–2 is provided for enabling controlled rectifier 16. Because magnetic amplifier MA–1 is biased to fire earlier than magnetic amplifier MA–2, the dominant current flow in the field windings is in the circuit comprising alternating current source 26, conductor 14, winding 12, controlled rectifier 17, and conductor 13. This causes current flow into the dotted end of winding 12 and thus, during succeeding half cycles, the magnetic flux created by the current flow is in the same direction.

In effect, voltage build-up is under the control of magnetic amplifier MA–1. Because of the reversal of winding sense between the control windings 24 and 34 on their respective cores, as one increases the positive magnetic saturation, the other increases the negative magnetic saturation. Since the current flow is controlled by the difference between the potentiometer 40 and the generator voltage, when equilibrium is reached, the current will no longer change and further voltage build-up will not occur. Changing the slider position of potentiometer 40 effectively determines the voltage output of the generator. Accordingly, it may well be incorporated as part of a voltage regulating circuit, as previously suggested.

In the event that the generator voltage exceeds the voltage from potentiometer 40, the current flow in control windings 24 and 34 will be in opposite directions. The saturation states of magnetic amplifiers MA–1 and MA–2 under these conditions will be such that magnetic amplifier MA–2 will turn on first. This circuitry is then operative to provide field current in windings 11 and 12 which tends to lower the generator voltage or produce a voltage of opposite polarity. This condition continues until balance is reestablished.

FIG. 2 illustrates a second embodiment of the invention wherein the separate halves of the field winding are supplied during each half cycle of input power in order to control the magnitude of the magnetic field in a single direction only. In this embodiment, successive half cycles of the alternating current supply are applied for the same period of time to one portion of the field winding whereas in the embodiment of FIG. 1, successive half cycles were alternately applied for the same period of time to each portion of the field winding. In FIG. 1 the portions were particularly wound with respect to one another in order to develop a unidirectional magnetic field in response to the opposite polarities experienced on successive half cycles of alternating current. In FIG. 2, each portion of the field is used to discretely develop only one polarization of magnetic field.

In order to more clearly describe the second embodiment, the elements therein which are similar to those already discussed in connection with FIG. 1 have been given the same numerical notation. Also, the magnetic amplifiers MA–1 and MA–2 in combination with the control circuits therefor have been condensed into individual blocks 20 and 30, respectively. Four controlled rectifiers are again used to limit the power applied to split field windings 11 and 12 of generator 10. The particular leads supplying enabling pulses from the magnetic amplifiers to the various controlled rectifiers have been labelled A, B, C, or D in accordance with the notations shown in FIG. 1. Thus, magnetic amplifier MA–1, for example, produces positive enabling pulses on leads A and B during successive half cycles of the alternating current supply which enables controlled rectifiers 50 and 51 at appropriate times in the respective half cycles for supplying the proper amount of power to field winding 11. Input transformer 100 has not been illustrated in FIG. 2 but it will be understood that this is connected as previously described, i.e., with primary 100–1 across the supply and each of secondaries 100–2 through 100–5 connected in individual control circuits between the gate and cathode of each controlled rectifier, and may be considered as part of the magnetic amplifier control circuits.

The circuit of FIG. 2 differs from that previously described, in that the controlled rectifiers interconnect alternating current source 26 to split field windings 11 and 12 in a somewhat different fashion. In FIG. 2, a supply transformer 200, having primary 201 and center-tapped secondary 202, is employed to provide power to the generator field windings. The end terminals of secondary 202 are connected to field winding 11 by controlled rectifiers 50 and 51 which are oriented to pass current from their respective end terminals to field winding 11. These same end terminals of secondary 202 are connected via controlled rectifiers 52 and 53 to field winding 12; the rectifiers in this instance being oriented to pass curent from field winding 12 to their respective end terminals of secondary 202. The center-tap of secondary 202 is connected to a junction point 54 formed by connecting the free ends of field windings 11 and 12 together.

The operation of supplying controlled amounts of direct current power to the field windings will be understood by considering a typical cycle of alternating current source 26. Assuming that the left-hand terminal of secondary winding 202 is positive during the first half cycle, and recalling the operation of input transformer 100 illustrated in FIG. 1, it will be apparent that an enabling pulse at terminal A of magnetic amplifier MA–1 enables controlled rectifier 50 at some selected time during the first half cycle of operation. Once enabled, rectifier 50 permits current flow from the left terminal of secondary winding 202, through winding 11, and back to the center-tap of secondary 202. During the second half cycle, an enabling pulse at terminal B of magnetic amplifier MA–1 enables controlled rectifier 51 to conduct and consequently provide a current path from the right-hand terminal of secondary 202 through portion 11 of the field winding to the center-tap of secondary 202. An amount of direct current power is thus delivered to field winding 11 having a magnitude determined by the conduction period of magnetic amplifier MA–1.

During the operation of magnetic amplifier MA–1, companion magnetic amplifier MA–2 functions in the manner described in conjunction with the circuit in FIG. 1. In the instant case, controlled rectifiers 52 and 53 are successively enabled during alternate half cycles of input power from source 26 and provide unidirectional current flow in winding 12 of the field. Here too, the amount of power actually supplied is determined by the conduction period of magnetic amplifier MA–2. Field windings 11 and 12 provide magnetic fields of opposing polarity in generator 10 and consequently, the degree of conduction therein determines the output voltage from the generator.

The hereinbefore described circuits constitute particular embodiments of the invention wherein silicon controlled rectifiers are utilized to supply controlled amounts of power to the split field windings of a generator. As mentioned, the arrangements taught herein are also applicable to the application of controlled power to split field windings of a motor or to a split load. In the illustrated embodiments, magnetic amplifiers are employed to control the conduction periods of the controlled rectifiers. It should be understood that other firing circuits within the teachings of this invention may be substituted for these magnetic amplifier arrangements. Further, individual biasing voltage and reference voltage sources have been illustrated for purposes of the description. These voltage sources may in fact be obtained by rectification of the fundamental alternating current source and may be part of regulation circuitry that operates as a function of the motor or generator operation.

It will, of course, be understood that it is not wished to be limited to the above described embodiments since modifications can be made both in the circuit arrangements and in the instrumentalities employed. It is contemplated in the appended claims to cover any such modifications as fall within the true spirit and scope of the invention.

What is claimed as new and desired to be secured by Letters Patent of the United States is:

1. A controlled rectifier circuit for establishing a magnetic field of controllable magnitude and polarization comprising, first and second field windings cumulatively responsive to direct current to develop a magnetic field having a polarization determined by the total ampere-turns thereof, a source of alternating current, a transformer supplied by said source of alternating current and having a center-tapped secondary, a junction between a first end of each of said field windings and the center-tap of said secondary, a first pair of controlled rectifiers, each discretely connecting the second end of said first field winding to opposite ends of said secondary and oriented to permit unidirectional current through said field winding when enabled to conduct, a second pair of controlled rectifiers, each discretely connecting the second end of said second field winding to opposite ends of said secondary and oriented to permit unidirectional current through said second field winding when enabled to conduct, the unidirectional current in said first and said second field windings being in directions to develop opposing magnetic fields, and control means responsive to the total magnetic field developed by the current in said first and second field windings and selectively operative during each half cycle of said alternating current to initiate conduction of the controlled rectifiers in each of said pairs.

2. In a controlled rectifier circuit for controlling the direct current power delivered to a split field winding having a first and second portion, a source of alternating current, an input transformer supplied by said alternating current and having a center-tapped secondary, a common junction between one end of each portion of said field winding and the center-tap on said secondary, a first pair of controlled rectifiers oriented to conduct unidirectional current in a first direction connecting each end of said secondary to the other end of said first portion of said field winding, a second pair of controlled rectifiers oriented to conduct unidirectional current in a second direction connecting each end of said secondary to the other end of said second portion of said field winding, and control means operative during successive half cycles of said alternating current to alternately render conductive the controlled rectifiers in each said pair, said control means being adjustable to selectively control the commencement of conduction of controlled rectifiers in said first pair with respect to the commencement of conduction of the controlled rectifiers in said second pair.

3. A circuit as defined in claim 2 wherein said control means comprises, a first and second self-saturating magnetic amplifier circuit discretely associated with each said pair of controlled rectifiers, the firing time of said first and second magnetic amplifier circuits being controlled by current in respective first and second control windings which are serially connected to one another to yield opposite saturation effects in each of said magnetic amplifier circuits in response to any given current condition.

4. A controlled rectifier circuit for establishing a magnetic field of controllable magnitude and polarization comprising, first and second field windings cumulatively responsive to direct current to develop a magnetic field having a polarization determined by the total ampere-turns thereof, a source of alternating current, a transformer supplied by said source of alternating current and having a center-tapped secondary, a junction between a first end of each of said field windings and the center tap of said secondary, controllable unidirectional current conducting means connecting the second end of each said field windings to opposite ends of said secondary and respectively oriented to permit unidirectional current through the associated field winding in opposing directions, and control means responsive to the total magnetic field developed by the current in said first and second field windings and selectively operative during each half cycle of said alternating current to selectively initiate conduction of said controllable unidirectional current conducting means.

References Cited in the file of this patent

UNITED STATES PATENTS 2,987,666   Manteuffel _____ June 6, 1961